(12) United States Patent
Filart et al.

(10) Patent No.: US 11,063,990 B2
(45) Date of Patent: Jul. 13, 2021

(54) ORIGINATING CALLER VERIFICATION VIA INSERTION OF AN ATTESTATION PARAMETER

(71) Applicant: T-Mobile USA, Inc., Bellevue, WA (US)

(72) Inventors: Homer Nicolas B. Filart, Renton, WA (US); Jose R. Mendoza, Jr., Renton, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/538,584

(22) Filed: Aug. 12, 2019

(65) Prior Publication Data

US 2020/0053136 A1 Feb. 13, 2020

Related U.S. Application Data

(60) Provisional application No. 62/718,294, filed on Aug. 13, 2018.

(51) Int. Cl.
| | |
|---|---|
| *H04L 29/06* | (2006.01) |
| *H04M 7/00* | (2006.01) |

(Continued)

(52) U.S. Cl.
CPC ...... *H04L 65/1069* (2013.01); *H04L 65/1006* (2013.01); *H04M 1/57* (2013.01);
(Continued)

(58) Field of Classification Search
None
See application file for complete search history.

(56) References Cited

U.S. PATENT DOCUMENTS

| | | |
|---|---|---|
| 2008/0089494 A1 | 4/2008 | Kaas et al. |
| 2010/0319063 A1 | 12/2010 | Koppolu et al. |

(Continued)

FOREIGN PATENT DOCUMENTS

| | | |
|---|---|---|
| KR | 20170035494 A | 3/2017 |

OTHER PUBLICATIONS

3GPP: TSG CT: IP multimedia call control protocol based on Session Initiation Protocol (SIP) and Session Description Protocol (SDP): Stage 3 (Release 15), 3GPP TS 24.229 V15.3.0, Jun. 22, 2018 See section 5.7.1.4 (pp. 303-305).

(Continued)

*Primary Examiner* — Edan Orgad
*Assistant Examiner* — Emmanuel K Maglo
(74) *Attorney, Agent, or Firm* — Han Santos, PLLC

(57) ABSTRACT

The present disclosure describes techniques for verifying an identity of an originating device that initiates a VoIP communication with a recipient device. Specifically, an attestation parameter module is configured to detect a call request associated with a VoIP communication that is initiated by an originating device. The attestation parameter module may authenticate an identity of the originating device, and in doing so, insert an attestation parameter into an identity header of a modified SIP INVITE message sent to the recipient device. In response to receiving the modified SIP INVITE message with the attestation parameter, the telecommunication network associated with the recipient device may verify the identity of the originating device based on the attestation parameter included within the SIP INVITE message. In some examples, the attestation parameter module may generate and insert an attestation parameter within a modified SIP INVITE message that is initiated in a SIP/non-SIP telecommunication network.

19 Claims, 10 Drawing Sheets

(51) Int. Cl.
*H04M 1/57* (2006.01)
*H04W 8/02* (2009.01)
*H04W 84/04* (2009.01)

(52) U.S. Cl.
CPC ............. *H04M 7/006* (2013.01); *H04W 8/02* (2013.01); *H04L 65/1016* (2013.01); *H04W 84/042* (2013.01)

(56) References Cited

U.S. PATENT DOCUMENTS

| | | | | |
|---|---|---|---|---|
| 2012/0020252 | A1* | 1/2012 | Bouthemy | H04L 12/66 370/259 |
| 2015/0156221 | A1* | 6/2015 | Abtin | H04L 65/80 370/352 |
| 2016/0021336 | A1* | 1/2016 | Abbott | H04N 7/147 348/14.02 |
| 2017/0048683 | A1* | 2/2017 | Asai | H04W 76/10 |
| 2017/0289863 | A1* | 10/2017 | Zhang | H04W 36/0022 |
| 2017/0347258 | A1 | 11/2017 | Carbone et al. | |
| 2018/0184277 | A1* | 6/2018 | Suzuki | H04W 4/029 |
| 2020/0028690 | A1* | 1/2020 | Barakat | H04M 3/00 |
| 2020/0045168 | A1* | 2/2020 | Sinha | H04M 3/42042 |

OTHER PUBLICATIONS

International Application No. PCT/US2019/046426, International Search Report and Written Opinion dated Dec. 2, 2019, 9 pages.

* cited by examiner

ORIGINATING CALLER VERIFICATION VIA INSERTION OF AN ATTESTATION PARAMETER

RELATED APPLICATION

This application claims priority to a co-pending, commonly owned U.S. Provisional Patent Application No. 62/718,294, filed on Aug. 13, 2018, and titled "STIR/SHAKEN Techniques," which is herein incorporated by reference in its entirety.

BACKGROUND

Illegitimate caller identity (ID) spoofing is a growing concern among telecommunication service providers and their clientele. Caller ID spoofing mechanisms, and illegitimate spoofing can evolve to evade mitigation techniques, and integration of new technologies into established Voice over Internet Protocol (VoIP) networks imposes interoperability and interworking challenges.

Assertion of telephone identity in VoIP networks between peering service providers, particularly in a 3GPP IP Multimedia Subsystem (IMS) environment, typically uses the P-Asserted-Identity (PAI) as the network self-asserted identity. The PAI usage assumes an inherent trust model between peering providers (i.e. originating and terminating service providers) and is passed on between peering providers without validation. However, in many telephone calling scenarios where there are many indirect call path relationships between the originating and terminating providers, these trust relationships are often simply not verifiable and do not allow for identification of the true origin of the call.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1A illustrates a first computing environment for operation of the attestation parameter module within a non-SIP network. FIG. 1B illustrates a second computing environment for operation of the attestation parameter module within a SIP network.

FIG. 3A illustrates a process for generating a modified SIP INVITE message in an originating SIP network for a VoIP communication intended for a recipient device within a SIP network. FIG. 3B illustrates a process for generating a modified SIP INVITE message in an originating SIP network for a non-VoIP communication intended for a recipient device within a non-SIP network. FIG. 3C illustrates a process for generating a modified SIP INVITE message in a non-SIP network for a VoIP communication intended for a recipient device in a SIP network.

FIG. 4A illustrates a process for inserting the attestation parameter into a SIP INVITE message that is initiated by an originating device in a SIP network. FIG. 4B illustrates a process for inserting the attestation parameter into a SIP INVITE message that is initiated by an originating device in a non-SIP network.

DETAILED DESCRIPTION

Figure 1A:
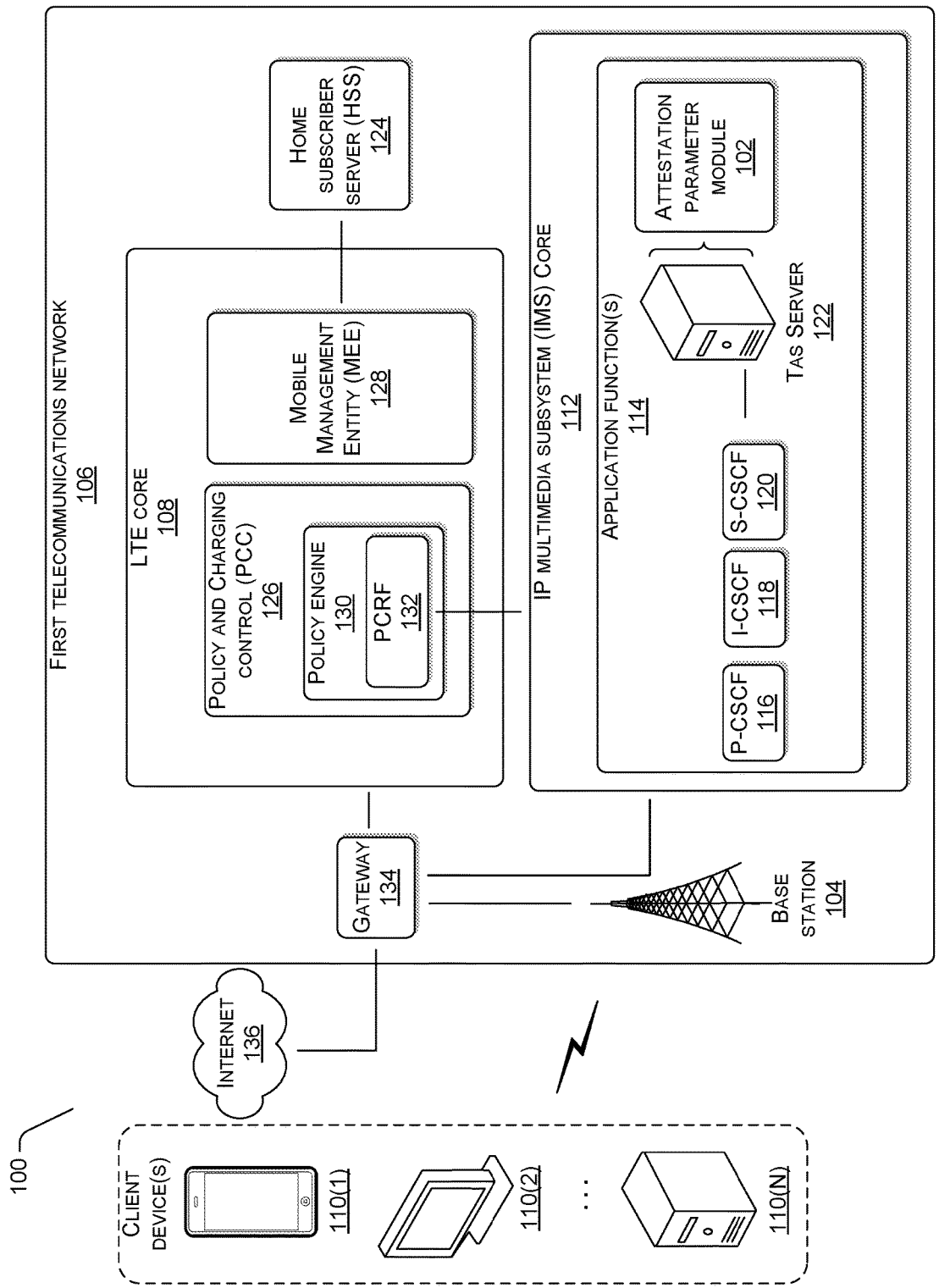
FIGS. 1A and 1B illustrate schematic views of computing environments for operations of an attestation parameter module within a non-SIP and SIP network.

This disclosure describes techniques that facilitate verifying an identity of an originating device that initiates a VoIP communication with a recipient device. An attestation parameter module is described that is configured to detect a call request associated with a VoIP communication that is initiated by an originating device. The attestation parameter module may authenticate an identity of the originating device, and in doing so, insert an attestation parameter into an identity header of a modified SIP INVITE message sent to the recipient device. In response to receiving the modified SIP INVITE message with the attestation parameter, the telecommunication network associated with the recipient device may verify the identity of the originating device based on the attestation parameter included within the SIP INVITE message. In some examples, the attestation parameter module may generate and insert an attestation parameter within a modified SIP INVITE message that is initiated in a SIP or non-SIP telecommunication network.

In the illustrate example, the attestation parameter module may be included within a Telephony Application Server (TAS) of a Session Internet Protocol (SIP) network, or a Mobile Switching Circuit (MSC) of a non-SIP network. However, further variations and modifications can be made such that the attestation parameter module may be remotely executable on a separate server or a separate computing device, by the TAS and/or MSC.

The techniques described herein are configured to be implemented within the Signature-based Handling of Asserted information using toKENs (SHAKEN) framework. Specifically, the SHAKEN framework is targeted at telecommunication service providers delivering phone calls over Voice over Internet Protocol (VoIP) and providing an end-to-end architecture for the authentication and assertion of a telephone identity by an originating service provider and the verification of the telephone identity by a terminating service provider.

The term "SIP INVITE message" corresponds to a call request configured to initiate a dialog for establishing a voice communication, such as a VoIP communication, between at least a pair of client devices. The SIP INVITE message may include a P-asserted identity header which conveys the proven identity of the originator of the SIP INVITE message within a trusted network. The P-asserted identity header has meaning within a trusted network framework by mutual agreement on the requirements for its use by the telecommunication network involved. The trusted network framework may correspond to the STIR/SHAKEN framework described earlier with reference to providing end-to-end architecture for authentication and assertion of a telephone identity.

The term "SIP network," as used herein, refers to a telecommunications network with an application layer protocol that can be used to establish, modify, and terminate multimedia sessions, such as Voice over Internet Protocol (VoIP) communications. By way of example, the Long-Term Evolution (LTE) telecommunication network and the 5G-NR (New Radio) telecommunication network are SIP networks.

Alternatively, the term "non-SIP based network," as used herein, refers to telecommunications network that restrict the handling of voice communications via a Public Switched Telephone Network (PSTN), which establishes a dedicated circuit (also referred to as a channel), for the duration of a voice communication transmission, or via a legacy Public Land Mobile Network (PLMN). By way of example, a legacy PLMN may the 2G telecommunication network and the 3G telecommunication network. The 2G and 3G telecommunication networks are examples of circuit-based networks (i.e. non-SIP networks).

Further, the term "techniques," as used herein, may refer to system(s), method(s), computer-readable instruction(s), module(s), algorithms, hardware logic, and/or operation(s) as permitted by the context described above and through the document.

Figure 1B:
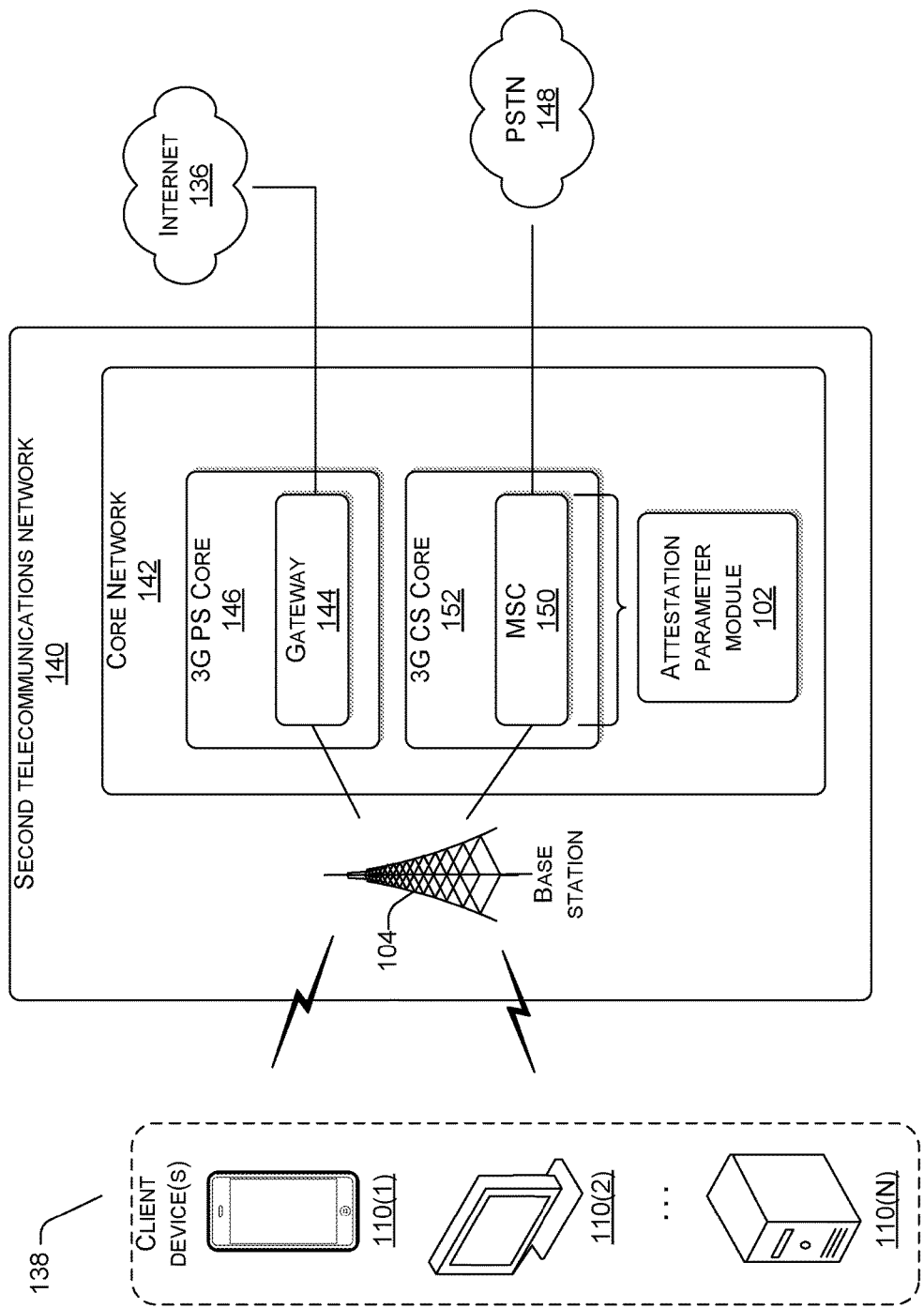

FIGS. 1A and 1B illustrate schematic views of computing environments that facilitate an operation of an attestation parameter module within a non-SIP and SIP telecommunication network.

FIG. 1A illustrates a schematic view of a first computing environment 100 that facilitates an operation of the attestation parameter module 102 within a first telecommunications network 106. In FIG. 1A, the telecommunication network corresponds to a SIP network, such as a Long-Term Evolution (LTE) network. The first computing environment 100 may include base station node(s) 104, an LTE core 108. The base station node(s) 104 are responsible for handling voice and data traffic via air interfaces between the LTE core 108 and client devices, such as client device(s) 110(1)-110(N). The LTE core 108 may provide telecommunication and data communication services to multiple client devices, such as an LTE-compatible client device, collectively referred to as client device(s) 110(1)-110(N).

The client device(s) 110(1)-110(N) may include any sort of electronic device, such as a cellular phone, a smart phone, a tablet computer, an electronic reader, a media player, a gaming device, a personal computer (PC), a laptop computer, etc. The client device(s) 110(1)-110(N) may include a subscriber identity module (SIM), such as an eSIM, to identify the client device(s) 110(1)-110(N) to a telecommunication service provider network (also referred to herein, as "telecommunication network").

In various examples, an IP Multimedia Subsystem (IMS) core 112 may reside within the first telecommunications network 106. The IMS core 112 may include application function(s) (AF) 114, such as a Proxy Call Session Control Function (P-CSCF) 116, an Interrogating Call Session Control Function (I-CSCF) 118, and a Serving Call Session Control Function (S-CSCF) 120, and a Telephone Application Server (TAS) 122. The P-CSCF 116 behaves like a proxy by accepting requests and serving them internally or forwarding them towards to the I-CSCF 118 and S-CSCF 120. The S-CSCF 120 acts as a Session Initiation Protocol (SIP) registrar and in some cases as a SIP redirect server. The S-CSCF 120 is responsible for processing the location registration of a client device, client authentication, and call routing and processing. The I-CSCF 118 is tasked with selecting an S-CSCF 120 for serving an initial SIP request, particularly when a client device initiating the request does not know which S-CSCF 120 should receive the request.

The TAS 122 may be configured to emulate calling features traditionally provided by a Public Switched Telephone Network (PSTN) or a legacy PLMN (i.e. 2G or 3G), such as call forwarding, voicemail, conference bridges, and/or so forth. The TAS 122 may further facilitate establishing a VoIP communication between client device(s) 110(1)-110(N).

In the illustrated example, the TAS 122 may include the attestation parameter module 102. The attestation parameter module 102 may be configured to verify an identity of an originating device (i.e. a client device) that initiates a call request at the first telecommunications network 106. The call request may take the form of a SIP INVITE message that is generated by an originating device (i.e. client device) within the first telecommunications network 106.

The attestation parameter module 102 may detect receipt of a SIP INVITE message at the TAS 122 and retrieve an originating device identifier from an identity header of the SIP INVITE message. In doing so, the attestation parameter module 102 may verify an identity of the originating device (i.e. originating device) based at least in part on a comparison of an originating device identifier with data records associated with one or more caller-identity lists. The one or more caller-identity lists may include a list of data records from a Home Subscriber Server (HSS) 124, a list of known-permissible caller identities, and a list of known-impermissible caller identities. The list of known-permissible caller identities and the list of known-impermissible caller identities may be included within a data store of the attestation parameter module 102.

In response to determining an identity of the originating device, the attestation parameter module 102 may generate an attestation parameter based at least in part on the verified identity. In response to generating the attestation parameter, the attestation parameter module 102 may modify an identity header of the SIP INVITE message to include the attestation parameter. The attestation parameter module 102 may transmit the modified SIP INVITE message to the TAS 122. The TAS 122 may interact with the I-CSCF 118 and S-CSCF 120 to route the modified SIP INVITE message to a receiving network associated with the recipient device 310.

While this disclosure describes modifying the TAS 122 to include an attestation parameter module 102, further variations and modifications can be made such that the attestation parameter module 102 is remotely executable on a separate server or a separate computing device, by the TAS 122. One of ordinary skill in the art would appreciate that such an embodiment remains within the scope of the invention, as defined in the appended claims.

Additionally, the LTE core 108 may further include a Policy and Charging Control (PCC) 126 and a Mobile Management Entity (MME) 128. The PCC 126 may enable detection of communication service data flow and provide parameters for policy control and/or charging control. In the illustrated example, the PCC 126 may include a policy engine 130, such as a Policy and Charging Rules Function (PCRF) 132. The MME 128 performs signal functions in the LTE core 108. The MME 128 and send and receive signaling information needed to set up bill, and address calls to the base station node(s) 104 and contains security protocols for authentication and authorization. The MME 128 may access the HSS 124 that is configured to authenticate an identity of a client and authorize operation of a corresponding client device on the first telecommunications network 106.

Further, a gateway 134 may interface with the IMS core 112 and the LTE core 108. The gateway 134 may include one or more servers and related components that are tasked with providing connectivity between the IMS core 112, the LTE core 108, the client device(s) 110(1)-110(N), and the internet 136. More specifically, the gateway 134 may act as a point of entry and exit for network traffic into the first telecommunications network 106.

FIG. 1B illustrates a second computing environment 138 that facilitates an operation of the attestation parameter module 102 within a non-SIP network, such as second telecommunications network 140. The second computing environment 138 described in FIG. 1B includes various details relating to the attestation parameter module 102 that were previously described with reference to FIG. 1A. As such, for brevity and ease of description, various details relating to the attestation parameter module 102 have been omitted herein to the extent that the same or similar details have been provided in relation to the first computing environment of FIG. 1A.

Referring to FIG. 1B, the second telecommunications network 140 may include a core network 142, which may further include 3G domain components that support 3G data traffic and 3G voice traffic. For example, 3G data traffic between a 3G-compatible, client device(s) 110(1)-110(N) and the internet 136 may be routed through one or more gateway(s) 144 of a 3G Packet Switch (PS) Core 146. Additionally, 3G voice traffic between the 3G-compatible, client device(s) 110(1)-110(N) and the Public Switched Telephone Network (PSTN) 148 may be routed through a Mobile Switch Center (MSC) 150 of the 3G Circuit Switch (CS) core 152. The MSC 150 is configured to control the network switching subsystem of the second telecommunications network 140. The network switching subsystem carries out call out and mobility management functions for client device(s) 110(1)-110(N).

In this example, the MCS 150 may be configured to include the attestation parameter module 102, described earlier with reference to FIG. 1A. While this disclosure describes modifying the MSC 150 to include the attestation parameter module 102, further variations and modifications can be made such that the attestation parameter module 102 is remotely executable on a separate server or a separate computing device by the MCS 150. One of ordinary skill in the art would appreciate that such an embodiment remains within the scope of the invention, as defined in the appended claims.

Figure 2A:
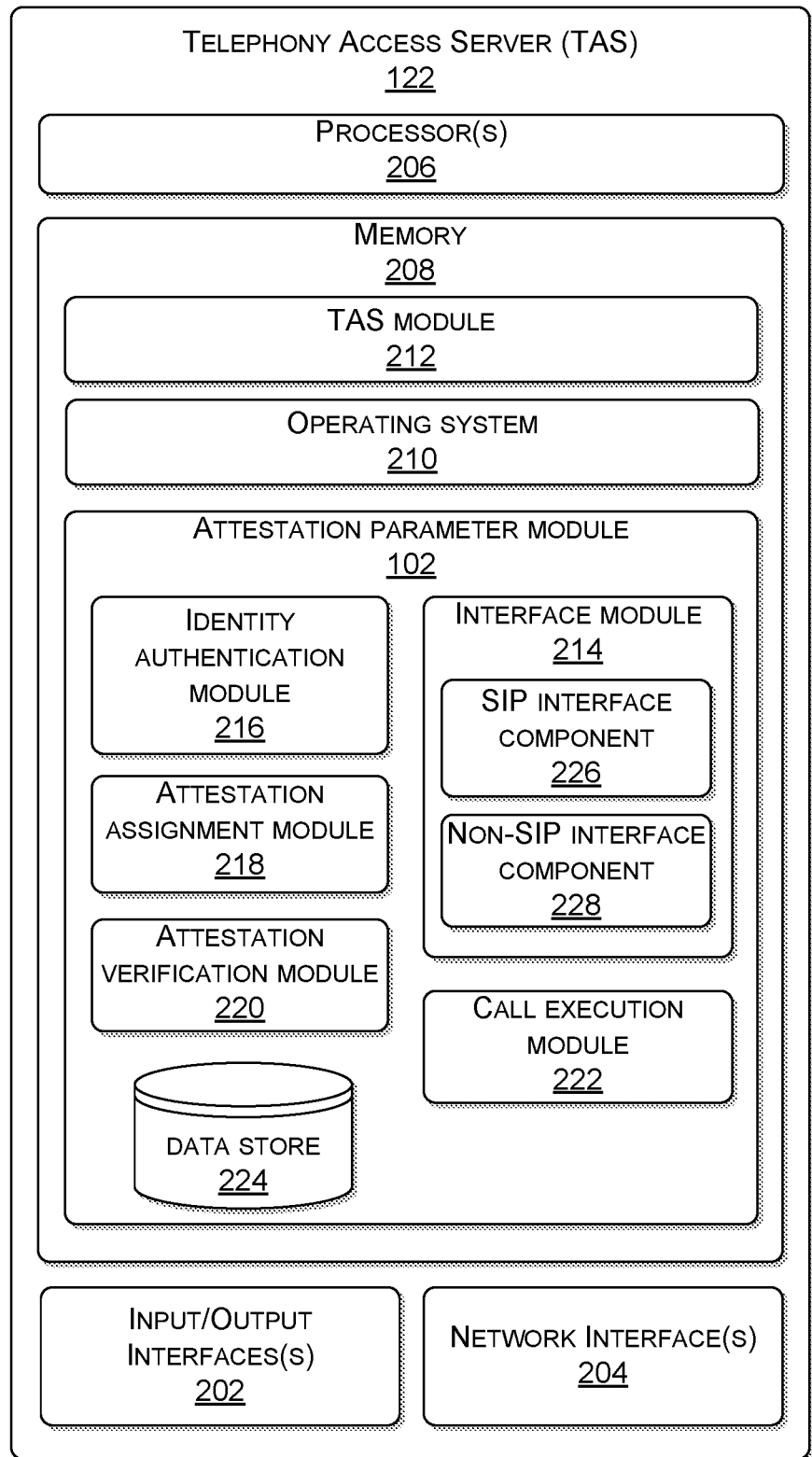
FIGS. 2A and 2B illustrate a block diagram of various components of the attestation parameter module 102 as incorporated within a TAS and an MSC, respectively.
Figure 2B:
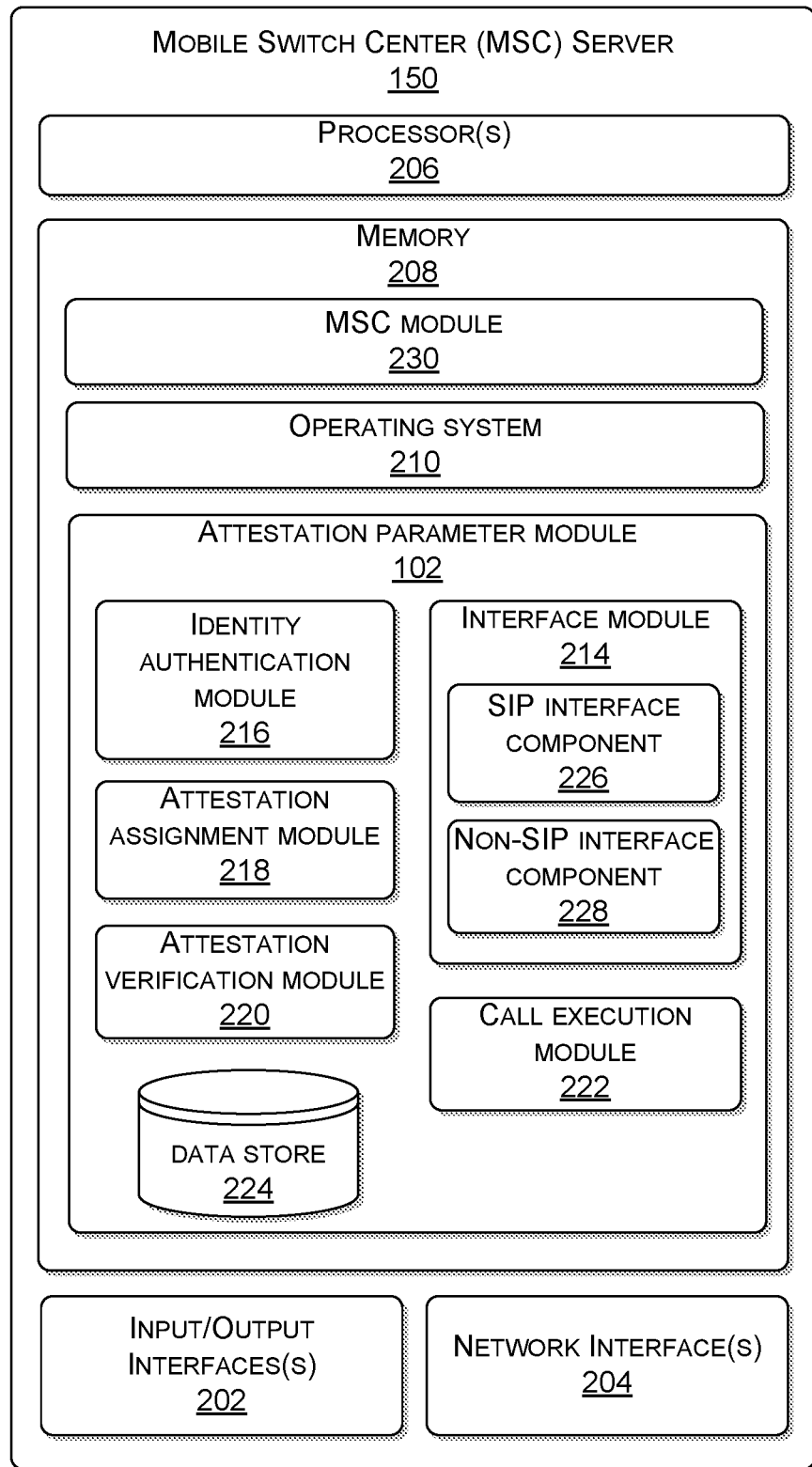

FIGS. 2A and 2B illustrate a block diagram of various components of the attestation parameter module 102 as incorporated within a TAS and an MSC, respectively.

Referring to FIG. 2A, the attestation parameter module 102 may be included within a TAS of a SIP network, as described with reference to FIG. 1A. The TAS 122 may include input/output interface(s) 202. The input/output interface(s) 202 may include any type of output interface known in the art, such as a display (e.g. a liquid crystal display), speakers, a vibrating mechanism, or a tactile feedback mechanism. Input/output interface(s) 202 also include ports for one or more peripheral devices, such as headphones, peripheral speakers, or a peripheral display. Further, the input/output interface(s) 202 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the TAS 122 may include network interface(s) 204. The network interface(s) 204 may include any sort of transceiver known in the art. For example, the network interface(s) 204 may include a radio transceiver that performs the function of transmitting and receiving radio frequency communications via an antenna. In addition, the network interface(s) 204 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 204 may include wired communication components, such as an Ethernet port or a Universal Serial Bus (USB).

Further, the TAS 122 may include one or more processor(s) 206 that are operably connected to memory 208. In at least one example, the one or more processor(s) 206 may be a central processing unit(s) (CPU), graphics processing unit(s) (GPU), or both a CPU and GPU or any other sort of processing unit(s). Each of the one or more processor(s) 206 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 206 may also be responsible for executing all computer applications stored in the memory, which can be associated with common types of volatile (RAM) and/or non-volatile (ROM) memory.

In some examples, memory 208 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 208 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 208 may include an operating system 210, a TAS module 212 and the attestation parameter module 102. The operating system 210 may be any operating system capable of managing computer hardware and software resources. The operating system 210 may include an interface layer that enables applications to interface with the input/output interface(s) 202 and the network interface(s) 204.

The TAS module 212 may be configured to perform traditional functions of the TAS 122, such as, but not limited to, emulating calling features traditionally provided by a Public Switched Telephone Network (PSTN), such as call forwarding, voicemail, conference bridges, and/or so forth. The TAS module 212 may be further configured to facilitate establishing a VoIP communication between the originating device and a recipient device via the first telecommunications network 106.

Moreover, the attestation parameter module 102 may include an interface module 214, an identity authentication module 216, an attestation assignment module 218, an attestation verification module 220, a call execution module 222, and a data store 224.

The interface module 214 may further include a SIP interface component 226 and a non-SIP interface component 228. The SIP interface component 226 may be configured to interface with a SIP network, such as an LTE telecommunication network. In one example, the SIP interface component 226 may monitor a TAS of the SIP network to detect receipt of a SIP INVITE message from an originating device. In this example, the SIP INVITE message may be associated with an originating device that intends to establish a VoIP communication with a recipient device at a recipient network. In another example, the SIP interface component 226 may monitor a TAS of the SIP network to detect receipt of a modified SIP INVITE message from an originating network. The modified SIP INVITE message may include an identity header with an attestation parameter that verifies an identity of an originating device that initiated a transmission of the modified SIP INVITE message from the originating network.

The SIP interface component 226 may monitor the TAS of the SIP network on a continuous basis or in response to a triggering event. In this example, the triggering event may correspond to receipt of a SIP INVITE message, or modified SIP INVITE message at a TAS of the SIP network.

The non-SIP interface component 228 may be configured to monitor the MSC of a non-SIP network to detect receipt of a call request from an originating device. In this example, the call request may be associated with an originating device that intends to establish a VoIP call with a recipient device a recipient, SIP network. In another example, the non-SIP interface component 228 may monitor the MSC of the non-SIP network to detect receipt of a modified SIP INVITE message from an originating, SIP network. In this latter example, the non-SIP interface component 228 may interact with the call execution module 222 to determine whether to establish a non-VoIP communication based on receipt of the modified SIP INVITE message.

The identity authentication module 216 may be configured to verify an identity of an originating device by comparing an originating device identifier associated with the originating device with data records associated with one or more caller-identity lists. In a SIP network embodiment, the identity authentication module 216 may retrieve the originating device identifier from an identity header of the SIP INVITE message. In a non-SIP network embodiment, the identity authentication module 216 may retrieve the originating device identifier from the call request. The originating device identifier may correspond to a phone number, a Mobile Station International Subscriber Directory Number (MSISDN), an International Mobile Subscriber Identity (IMSI), or any combination thereof.

Moreover, the one or more caller-identity lists may include a list of data records from an HSS. In this example, the HSS may include subscriber data records used to authenticate an identity of a device associated with a subscriber of the SIP network. Alternatively, or additionally, the caller-identity lists may include a list of known-permissible caller identities. The list of known-permissible caller identities may include a list of trusted devices that are associated with a trusted environment of the SIP network. The trusted environment may include one or more SIP networks, of which the SIP network belongs, and of which share a common subscriber base or access a common repository of subscriber data.

In another example, the caller-identity lists may also include a list of known-impermissible caller identities. The list of known-impermissible caller identities may include a list of untrusted devices that are not permitted to access the SIP network or a trusted environment associated with the SIP network.

The attestation assignment module 218 may generate an attestation parameter based at least in part on the verified identity of the originating device. By way of example, the attestation parameter may indicate that an originating device is known-permissible, known-impermissible, or unknown. A "known-permissible" attestation parameter may reflect a match between an originating device identifier and a data record of an HSS or a data record of a list of known-permissible caller identities accessible by the identity authentication module 216. A "known-impermissible" attestation parameter may reflect a match between an originating device identifier and a data record of a list of known-impermissible caller identities accessible by the identity authentication module 216. An "unknown" attestation parameter may reflect no match between an originating device identifier and a data record of an HSS, or a list of known-permissible or known-impermissible caller identities accessible by the identity authentication module 216.

The attestation verification module 220 may be configured to detect an attestation parameter of a modified SIP INVITE message received at a receiving SIP network. In this example, the attestation verification module 220 may use the attestation parameter to verify an identity of the originating device that initiated transmission of the modified SIP INVITE message to the receiving SIP network.

The call execution module 222 may be configured to establish a VoIP communication based at least in part on the attestation parameter within a modified SIP INVITE message and/or the SIP capability of the telecommunication network. In one example, the call execution module 222 may establish a VoIP communication with the originating device in response to determining that the attestation parameter corresponds to a known-permissible parameter. Alternatively, the call execution module 222 may reject establishing a VoIP communication (i.e. fail to transmit an acknowledgement of the modified SIP INVITE message) in response to the attestation parameter corresponding to a known-impermissible parameter or an unknown parameter.

To establish a VoIP communication, the call execution module 222 may be configured to generate and transmit an acknowledgement message to the originating device that sent the modified SIP INVITE message.

In another example, the call execution module 222 may be configured to reject establishing a VoIP communication in response to the receiving telecommunication network being a non-SIP network. In this example, the call execution module 222 may selectively establish a non-VoIP communication with the originating device based at least in part on authenticating an identity of the originating device within the non-SIP network. Authentication of the identity of the originating device is performed independently of analyzing the attestation parameter included within the modified SIP INVITE message.

The data store 224 may include data records associated with the one or more lists of caller identities. In one example, the one or more lists of caller identities may include a list of permissible caller-identities and a list of impermissible caller-identities.

Referring to FIG. 2B, the attestation parameter module 102 may be included within an MSC 150 of a non-SIP network, as described with reference to FIG. 1B. The MSC 150 may include input/output interface(s) 202 and network interface(s) 204 that correspond to those described with reference to FIG. 2A. Further, the MSC 150 may include one or more processors 206 and memory 208 that correspond to those described with reference to FIG. 2A. The memory 208 may include an operating system 210, an MSC module 230 may be configured to perform traditional functions of the MSC 1150, such as, but not limited to, controlling the network switching subsystem of the second telecommunications network 140 that carries out call out and mobility management functions for client devices.

Moreover, the attestation parameter module 102 of the MSC 150 may correspond to the attestation parameter module 102 of the TAS 122, as described earlier with reference to FIG. 2A.

Figure 3A:
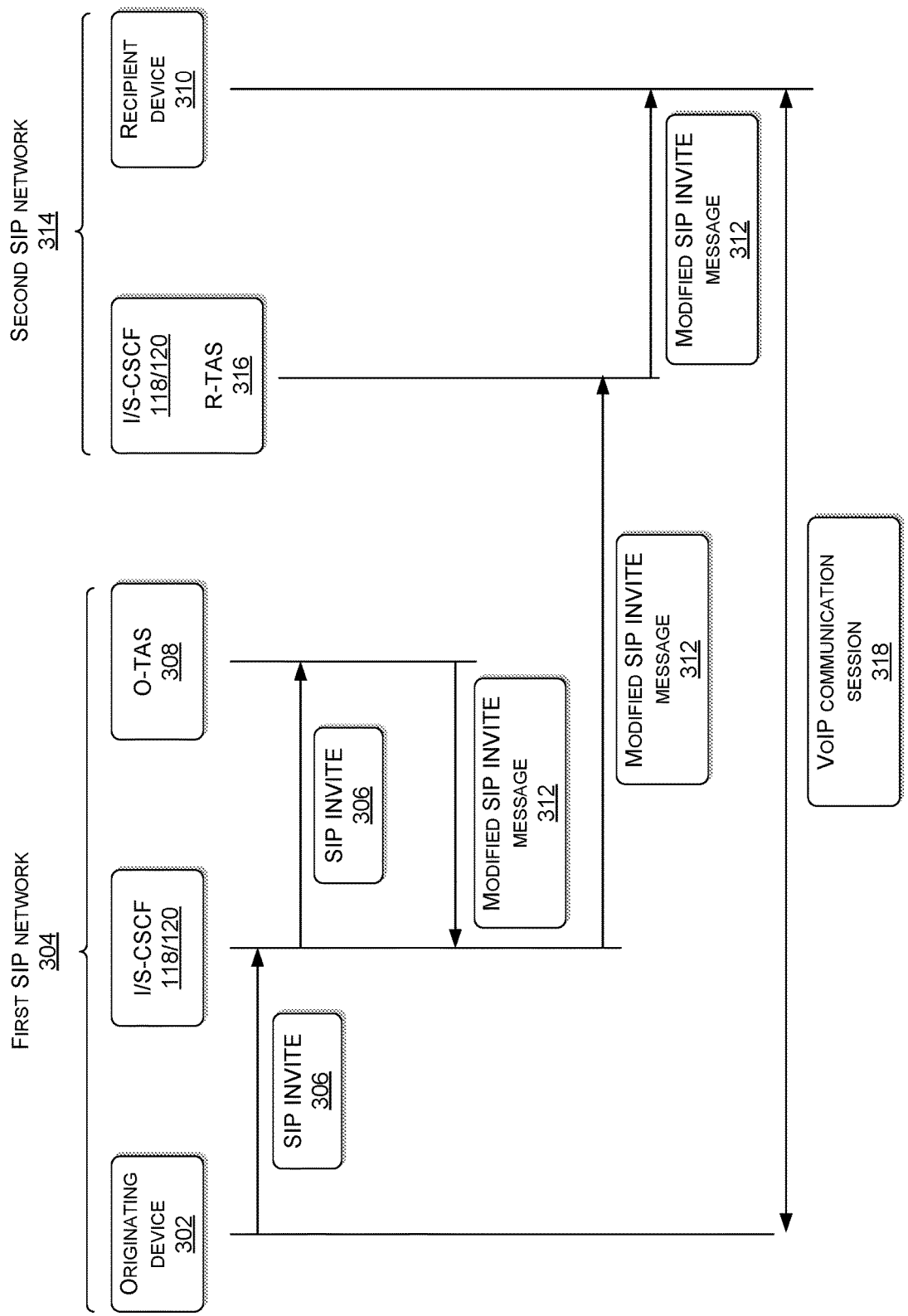
FIGS. 3A through 3C illustrate block diagrams of processes for generating a modified SIP INVITE message that includes an attestation parameter at an originating SIP and non-SIP network.
Figure 3B:
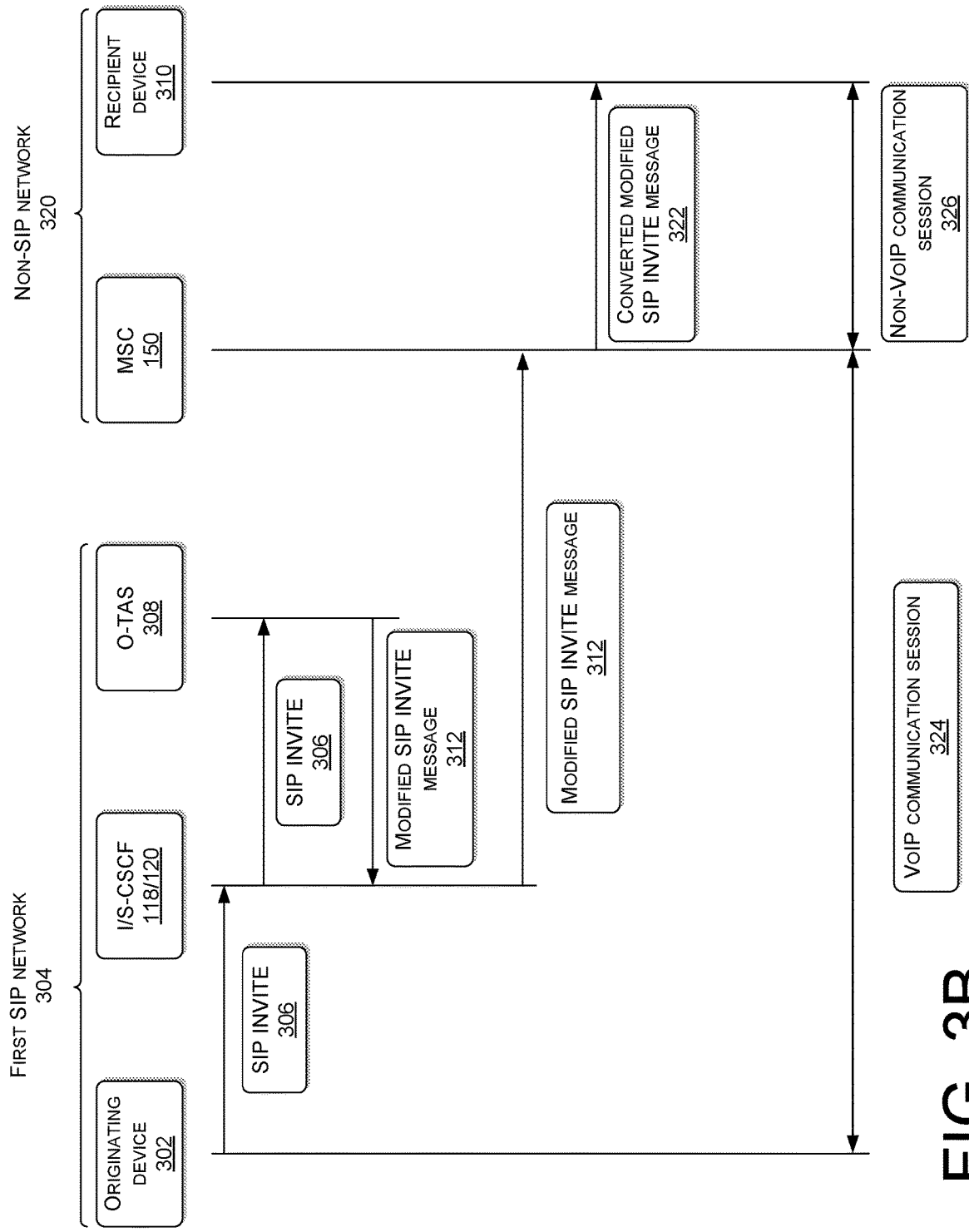
Figure 3C:
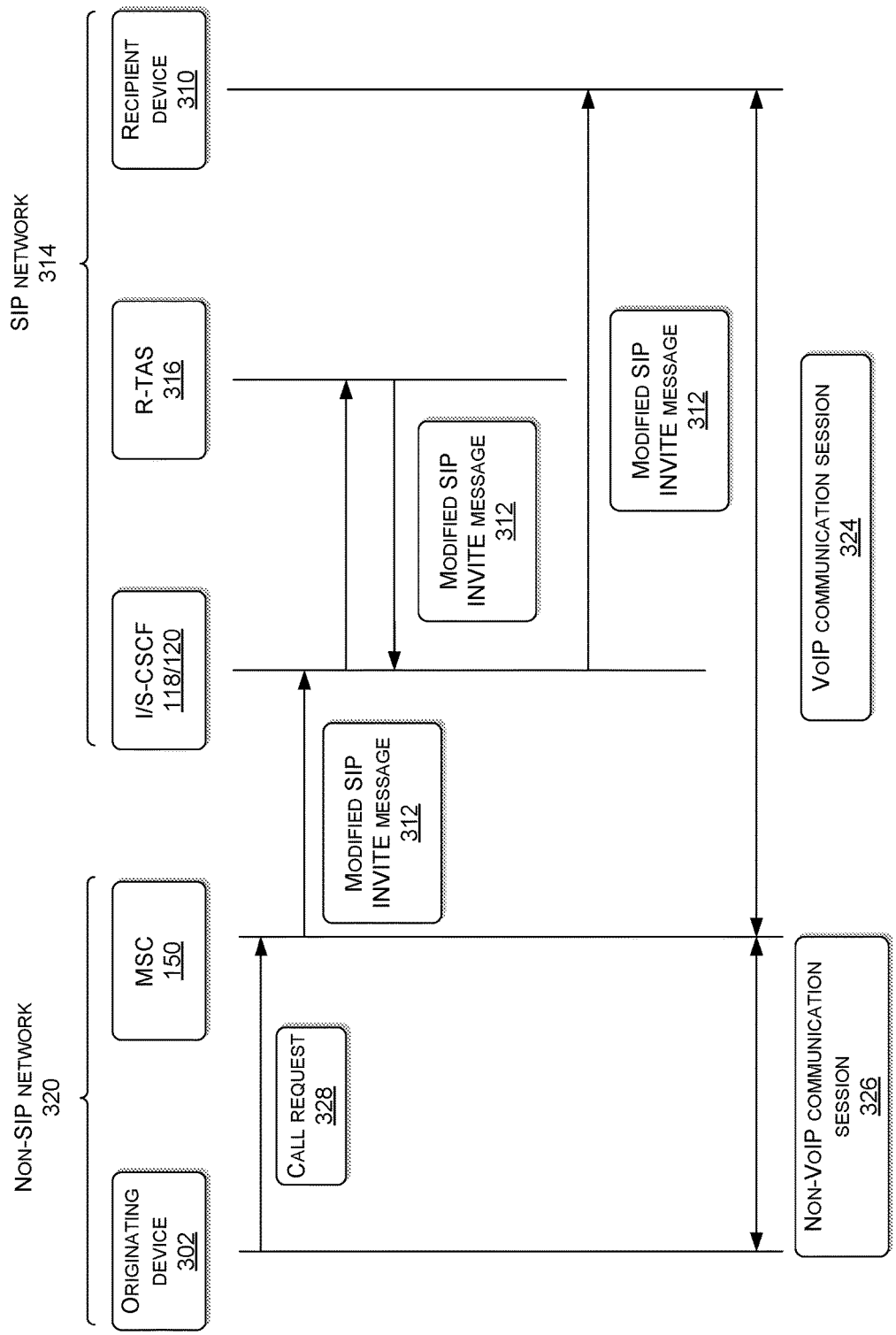

FIGS. 3A through 3C illustrate block diagrams of processes for generating a modified SIP INVITE message that includes an attestation parameter, at an originating SIP and non-SIP network. FIG. 3A illustrates a process for generating a modified SIP INVITE message in an originating SIP network for a VoIP communication intended for a recipient device within a SIP network.

Referring to FIG. 3A, the originating device 302 may initiate a call request within a first SIP network 304. By way of example, the first SIP network 304 may correspond to the first telecommunications network 106 (i.e. LTE network), as described with reference to FIG. A. The first SIP network 304 may correspond to a Home Public Land Mobile Network (HPLMN) of the originating device 302 or a Visited Public Land Mobile Network (VPLMN) within which the originating device 302 is roaming when initiating the call request.

The first SIP network 304 may receive the call request as a SIP INVITE message 306 at a P-CSCF and further transmit the SIP INVITE message 306 to an I-CSCF, which is tasked with selecting an S-CSCF for serving the SIP INVITE message 306. In FIG. 1A, the I-CSCF and S-CSCF are collectively referred to as I/S-CSCF 118/120. In this example, the selected S-CSCF 120 may transmit the SIP INVITE message 306 to a Telephony Access Server (TAS) associated with the first SIP network 304, identified as O-TAS 308 in FIG. 3A. The TAS 122, may correspond to O-TAS 308, and may emulate calling features traditionally provided by a Public Switched Telephone Network (PSTN), such as call forwarding, voicemail, conference bridges, and/or so forth. A TAS may further facilitate establishing a VoIP communication between the originating device 302 and the recipient device 310.

The O-TAS 308 may be further configured to include the attestation parameter module 102, as described earlier with reference to FIG. 2A. The attestation parameter module 102 may interact with a TAS module 212 of the O-TAS 308 and detect receipt of the SIP INVITE message 306. In this way, the O-TAS 308 may retrieve an originating device identifier associated with the originating device 302 from the identity header of the SIP INVITE message 306. The O-TAS 308 may verify an identity of the originating device 302 by comparing the originating device identifier with data records associated with one or more caller-identity lists. The one or more caller-identity lists may include a list of data records from an HSS, a list of known-permissible caller identities, and a list of known-impermissible caller identities.

In one example, the O-TAS 308 may verify the originating device 302 as a known-permissible caller-identity based at least in part on a match between the originating device identifier and a data record within the HSS of the first SIP network 304 or a data record within the list of known-permissible caller identities accessible by the first SIP network 304. Alternatively, the O-TAS 308 may verify the originating device 302 as a known-impermissible caller-identity based at least in part on a match between the originating device identifier and a data records within the list of known-impermissible caller identities accessible by the first SIP network 304.

Further, the attestation parameter module 102 of the O-TAS 308 may generate an attestation parameter based at least in part on the O-TAS 308 verifying an identity of the originating device 302. By way of example, the attestation parameter may indicate that an originating device is known-permissible, known-impermissible, or unknown.

It is noteworthy that the attestation parameter terms "known-permissible," "known-impermissible," and "unknown," are presented for illustrative purposes only. One of ordinary skill in the art would appreciate that any terminology may be used to indicate an un/verified identity of an originating device. For example, an attestation parameter may correspond to "verstat-=TN-Validation-Passed" to indicate that an originating device identifier has been verified by an originating network. Alternatively, an attestation parameter may correspond to "verstat-No-TN-Validation" to indicate that an originating device has not been verified by the originating network.

In response to generating the attestation parameter, the attestation parameter module 102 of the O-TAS 308 may modify an identity header of the SIP INVITE message 306 to include the attestation parameter. The attestation parameter module 102 may transmit the modified SIP INVITE message 312 to the O-TAS 122 associated with the first SIP network 304. The O-TAS 308 may interact with the I-CSCF 118 and S-CSCF 120 to route the modified SIP INVITE message 312 to the second SIP network 314 associated with the recipient device 310.

At the second SIP network 314, TAS 122, namely R-TAS 316, may detect receipt of the modified SIP INVITE message 312 via a I-CSCF 118 and S-CSCF 120 of the second SIP network 314 (hereinafter "I/S-CSCF 118/120"). In doing so, the R-TAS 316 may parse through the identity header of the modified SIP INVITE message 312 to identify the attestation parameter.

Further, the R-TAS 316, via the attestation parameter module 102 of the R-TAS 316, may determine that the attestation parameter corresponds to a "known-permissible" parameter and transmit computer-executable instructions to the R-TAS 316 of the second SIP network 314. In this way, the R-TAS 316 may cause the I/S-CSCF 118/120 to selectively transmit an acknowledgement of receipt of the modified SIP INVITE message 312 to the recipient device 310. The recipient device 310 may transmit an acknowledgement of the modified SIP INVITE message 312 to the first SIP network 304. At the first SIP network 304, upon receipt of the acknowledgement, the first SIP network 304, and upon receipt of the acknowledgement message, the first SIP network 304 may establish a VoIP communication session 318 between the originating device 302 and the recipient device 310.

In another embodiment, the R-TAS 316, via the attestation parameter module 102, may determine that the attestation parameter corresponds to "known-impermissible" or "unknown." In this latter example, the R-TAS 316 may transmit computer-executable instructions to the/S-CSCF 118/120 to selectively reject the VoIP communication request from the originating device 302.

FIG. 3B illustrates a process for generating a modified SIP INVITE message at a first SIP network 304 that is intended to initiate a VoIP/non-VoIP communication with a recipient device 310 at a non-SIP network 320. The process described in FIG. 3B includes various details relating to the first SIP network 304 that were previously described with reference to FIG. 3A. As such, for brevity and ease of description, various details relating to receiving a call request (i.e. the SIP INVITE message 306) at the first SIP network 304 from the originating device 302, verifying an identity of the originating device 302, generating an attestation parameter, and modifying the SIP INVITE message 306 to include the attestation parameter, have been omitted herein to the extent that the same or similar details have been provided in relation to the process described with reference to FIG. 3A.

In the illustrated example of FIG. 3B, the O-TAS 308 may interface with the I/S-CSCF 118/120 of the first SIP network 304 to route the modified SIP INVITE message 312 to the non-SIP network 320. In this example, the modified SIP INVITE message 312 may include an attestation parameter associated with an identity of the originating device 302.

At the non-SIP network 320, the MSC 150 of the non-SIP network 320 may detect receipt of the modified SIP INVITE message 312. In one example, the MSC 150 may ignore the modified SIP INVITE message 312, thereby rejecting the request to initiate the communication. In another example, the MSC 150 may use the originating device identifier to verify an identity of the originating device 302. In one example, the MSC 150 may compare the originating device identifier with a permissible list of caller-identities accessible to the non-SIP network 320. In response to verifying the originating device identifier as a permissible caller identity, the non-SIP network 320 may generate a converted modified SIP INVITE message 322 that is configured to initiate a non-VoIP communication between the originating device 302 and the recipient device 310 in format that is acceptable to the non-SIP network 320. In this example, the communication session initiated by the originating device 302 is a VoIP communication session 324 through to the MSC 150 of the non-SIP network 320. Thereafter, the communication session is converted to a non-VoIP communication session 326 between the MSC 150 within the non-SIP network 320 and the recipient device 310 within the non-SIP network 320.

FIG. 3C illustrates a process for generating a modified SIP INVITE message in a non-SIP network for a VoIP communication intended for a recipient device in a SIP network. Referring to FIG. 3C, the originating device 302 may initiate a call request within the non-SIP network 320 that is intended for a recipient device 310 within a second SIP network 314. In this example, the MSC 150 of the non-SIP network 320 may detect receipt of a call request 328 at the MSC 150 associated with the non-SIP network 320. The MSC 150 may retrieve an originating device identifier associated with the originating device 302 from the call request 328 and compare the originating device identifier with data records associated with one or more caller-identity lists. The one or more caller-identity lists may include a list of data records from an HSS of the non-SIP network 320, a list of known-permissible caller identities, and a list of known-impermissible caller identities.

The MSC 150, via an attestation parameter module 102 of the MSC 150, may generate an attestation parameter based at least in part on the verified identity of the originating device 302. By way of example, the attestation parameter may indicate that the originating device is known-permissible, known-impermissible, or unknown.

In response to generating the attestation parameter, the MSC 150 may generate a SIP INVITE message 306 for delivery to the second SIP network 314 associated with the recipient device 310. In one example, the MSC 150, via the attestation parameter module 102 of the MSC 150, may generate a SIP INVITE message and further modify the identity header of the SIP INVITE message to generate a modified SIP INVITE message 312 that includes the attestation parameter associated with the originating device 302.

The MSC 150 may transmit the modified SIP INVITE message 312 from the non-SIP network 320 to the second SIP network 314 associated with the recipient device 310.

At the second SIP network 314, the R-TAS 316 may detect receipt of the modified SIP INVITE message 312 via the I/S-CSCF 118/120. In doing so, the R-TAS 316 of the second SIP network 314 may parse through the identity header of the modified SIP INVITE message 312 to identify the attestation parameter. Using the attestation parameter, the R-TAS 316, via the attestation parameter module 102 of the R-TAS 316, may verify an identity of the originating device 302, and in doing so, transmit the modified SIP INVITE message 312 to the recipient device 310 in response to the attestation parameter corresponding to a "known-permissible" parameter.

The recipient device 310 may then transmit an acknowledgement of the modified SIP INVITE message 312 to the non-SIP network 320. Upon receipt of the acknowledgement, the MSC 150 may establish a communication session between the originating device 302 and the recipient device 310. In this example, the communication session initiated by the originating device 302 is a non-VoIP communication session 326 through to the MSC 150 within the non-SIP network 320. Thereafter, the communication session is converted to a VoIP communication session 324 between the MSC 150 within the non-SIP network 320 and the recipient device 310 within the second SIP network 314.

Figure 4A:
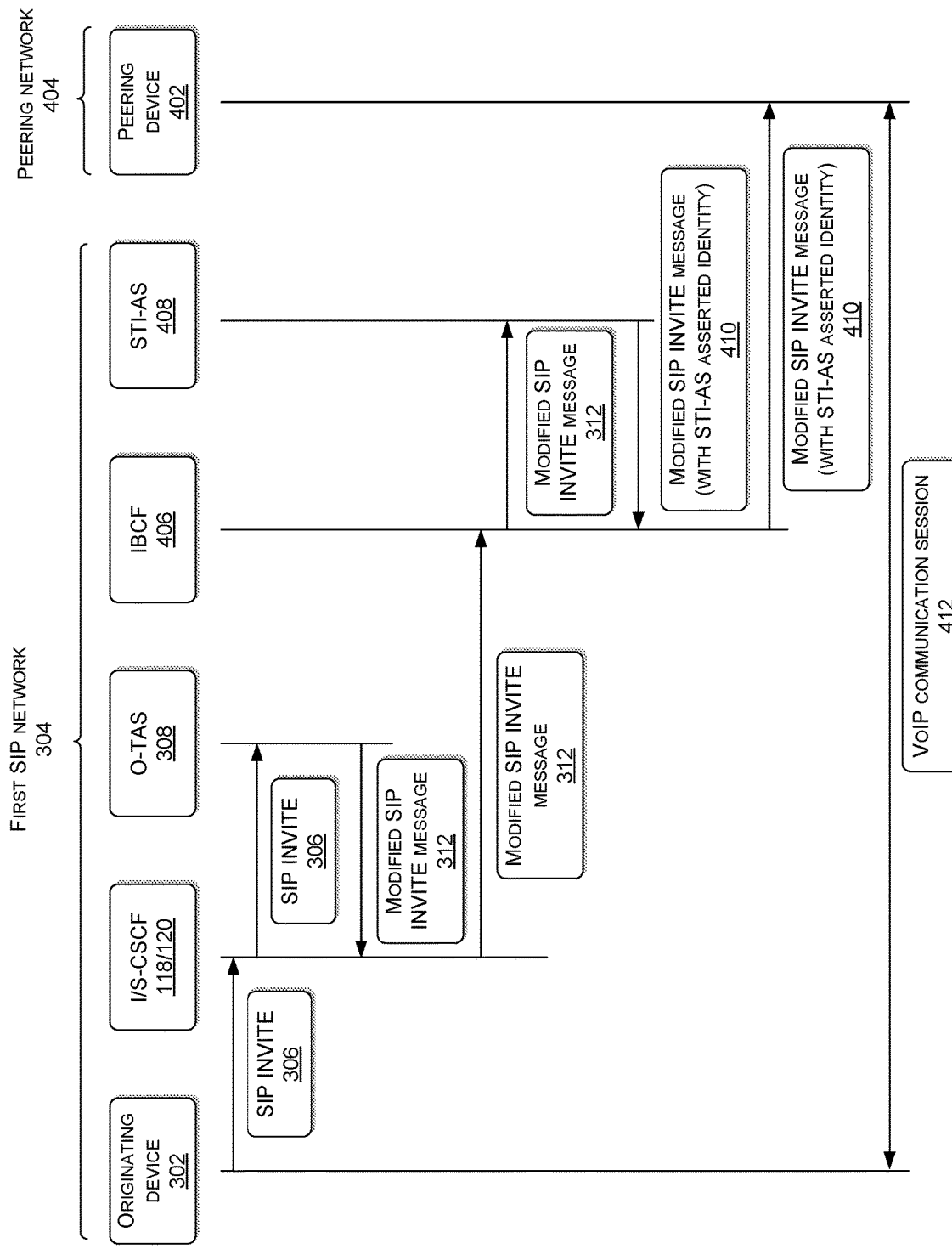
FIGS. 4A and 4B illustrate block diagrams of processes for inserting an attestation parameter into a SIP INVITE message that is intended for a peering network.
Figure 4B:
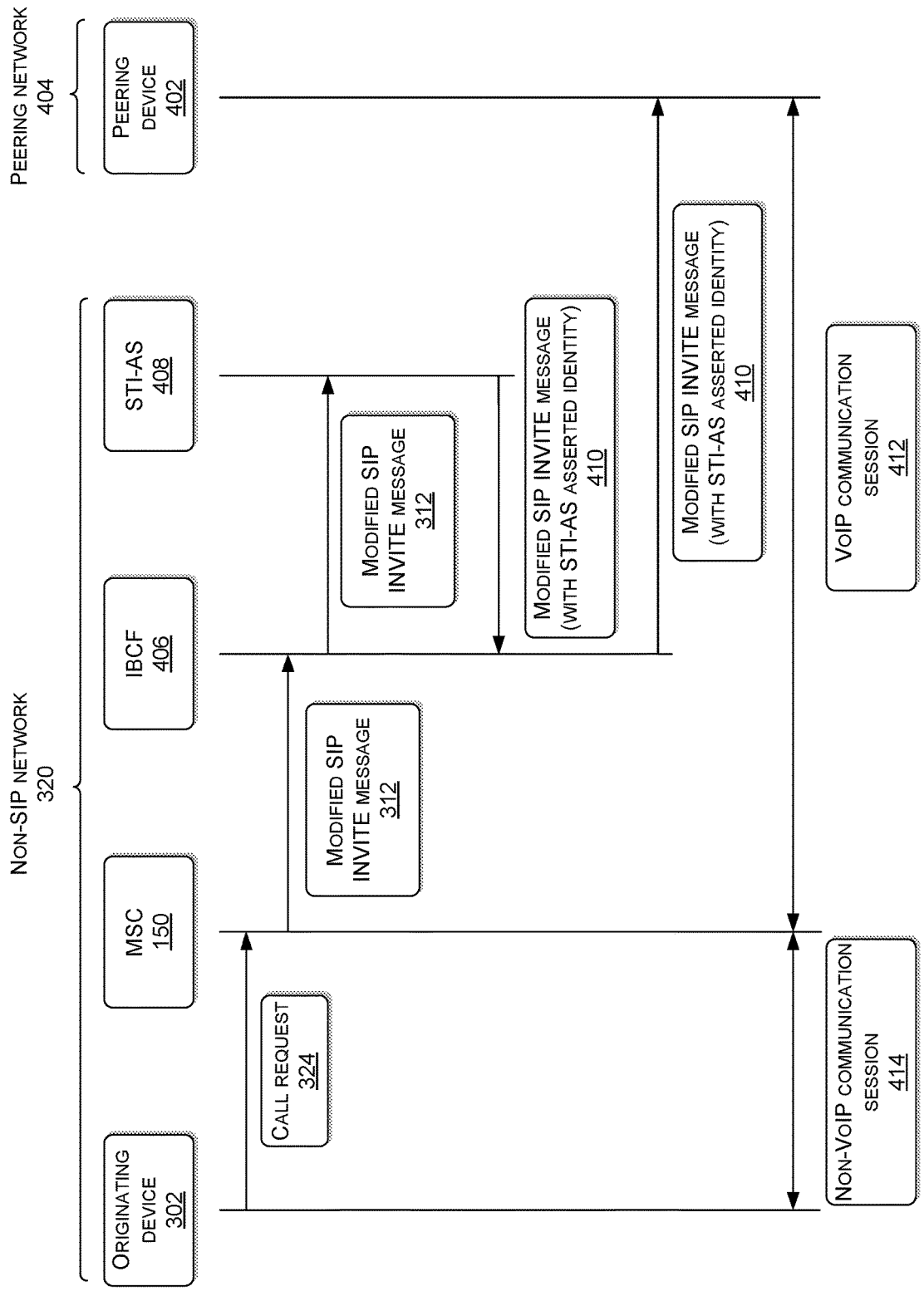

FIGS. 4A and 4B illustrate block diagrams of processes for inserting an attestation parameter into a SIP INVITE message that is intended for a peering device 402 within a peering network 404. FIG. 4A illustrates a process for inserting the attestation parameter into a SIP INVITE message that is initiated by an originating device 302 in a first SIP network 304. FIG. 4B illustrates a process for inserting the attestation parameter into a SIP INVITE message 306 that is initiated by an originating device 302 in a non-SIP network 320. A peering network 404 may correspond to an Internet-based network, such as a SIP telecommunication network, that connects and exchanges communication data with other networks.

Referring to FIG. 4A, the originating device 302 may initiate a call request within a first SIP network 304 to establish a VoIP communication that is intended for a peering device 402 within a peering network 404. The process described in FIG. 4A includes various details relating to initiating a call request at a SIP network, as described earlier with reference to FIG. 3A. As such, for brevity and ease of description, various details relating to detecting receipt of a SIP INVITE message 306 at the first SIP network 304 from the originating device 302, verifying an identity of the originating device 302, generating an attestation parameter, and modifying the SIP INVITE message 306 to include the attestation parameter, have been omitted herein to the extent that the same or similar details have been provided in relation to the process described with reference to FIG. 3A.

Further, in response to generating a modified SIP INVITE message 312, the O-TAS 308 of the first SIP network 304 may interact with the I/S-CSCF 118/120 to route the modified SIP INVITE message 312 from the first SIP network 304 to the peering network 404, via an Interconnection Border Control Function (IBCF) 406 of the first SIP network 304.

The IBCF 406 is a network element deployed to protect SIP networks, such as the first SIP network 304. In the illustrated example, the IBCF 406 may correspond to the network edge of the first SIP network 304 from the rest of the internet. The IBCF 406 may provide the SIP network with measurements, access control, and data conversion facilities of communications received that the network edge.

Moreover, within a STIR/SHAKEN framework that provides an end-to-end architecture for authentication and assertion of a telephone identity by an originating service provider, the IBCF 406 may transmit the modified SIP INVITE message 312 to a Secure Telephone Identity Authentication Service (STI-AS) 408 associated with the first SIP network 304. The STI-AS 408 may verify the identity of the originating device 302 based at least in part on the attestation parameter included with the identity header of the modified SIP INVITE message 312. In response to verifying an identity of the originating device 302, the STI-AS 408 may digitally sign the modified SIP INVITE message using a private key retrieved from a Secure Key Store (SKS) of the SHAKEN framework, and further insert an identity header field in the P-Asserted-identity header field of the modified SIP INVITE message 312. In this instance, the modified SIP INVITE message 312, together with the identity header field inserted by the STI-AS 408, may be used to verify an identity of originating device 302 at the peering network 404.

In response to the peering network 404 verifying an identity of the originating device 302, the peering network 404 may facilitate establishing a VoIP communication session 412 between the originating device 302 in the first SIP network 304 and the peering device 402.

It is noteworthy that the SIP INVITE message 312 may traverse through multiple peering network elements before reach the peering device 402. Examples of such peering network elements include the peering network IBCF, P-CSCF, I-CSCF, S-CSCF, TAS, and/or so forth.

Referring to FIG. 4B, the originating device 302 may initiate a call request 328 within a non-SIP network 320 that is intended for a peering network 404. The process described with reference to FIG. 4B includes various details relating to initiating a call request at a non-SIP network, as described earlier with reference to FIG. 3C. As such, for brevity and ease of description, various details relating to detecting receipt of a call request 328 at an MSC 150 of the non-SIP network 320, verifying an identity of the originating device 302, generating an attestation parameter, and generating and modifying a SIP INVITE message 306 that includes the attestation parameter, have been omitted herein to the extent that the same or similar details have been provided in relation to the process described with reference to FIG. 3C.

Further, in response to generating a modified SIP INVITE message 312, the MSC 150 may route the modified SIP INVITE message 312 from the non-SIP network 320 to the peering device 402 within the peering network 404, via the IBCF 406 of the non-SIP network 320.

Moreover, the IBCF 406 may transmit the modified SIP INVITE message 312 to the STI-AS associated with the non-SIP network 320. The STI-AS 408 may verify the identity of the originating device 302 based at least in part on the attestation parameter included with the identity header of the modified SIP INVITE message 312. In response to verifying an identity of the originating device 302, the STI-AS may digitally sign the modified SIP INVITE message 312 using a private key retrieved from the SKS and further insert an identity header field in the P-Asserted-identity header field of the modified SIP INVITE message 312. In this instance, the modified SIP INVITE message 312, together with the identity header field inserted by the STI-AS 408, may be used to verify an identity of the originating device 302 at the peering network 404.

In response to the peering network 404 receiving the modified SIP invite message that includes the STI-AS asserted identity 410, the peering network 404 may verify the identity of the originating device 302, and further facilitate establishing a communication session between the originating device 302 and the peering device 402. In this example, the communication session initiated by the originating device 302 is a non-VoIP communication session 414 through to the MSC 150 within the non-SIP network 320. Thereafter, the communication session is converted to a VoIP communication session 412 between the MSC 150 within the non-SIP network 320 and the peering device 402 within the peering network 404.

Figure 5:
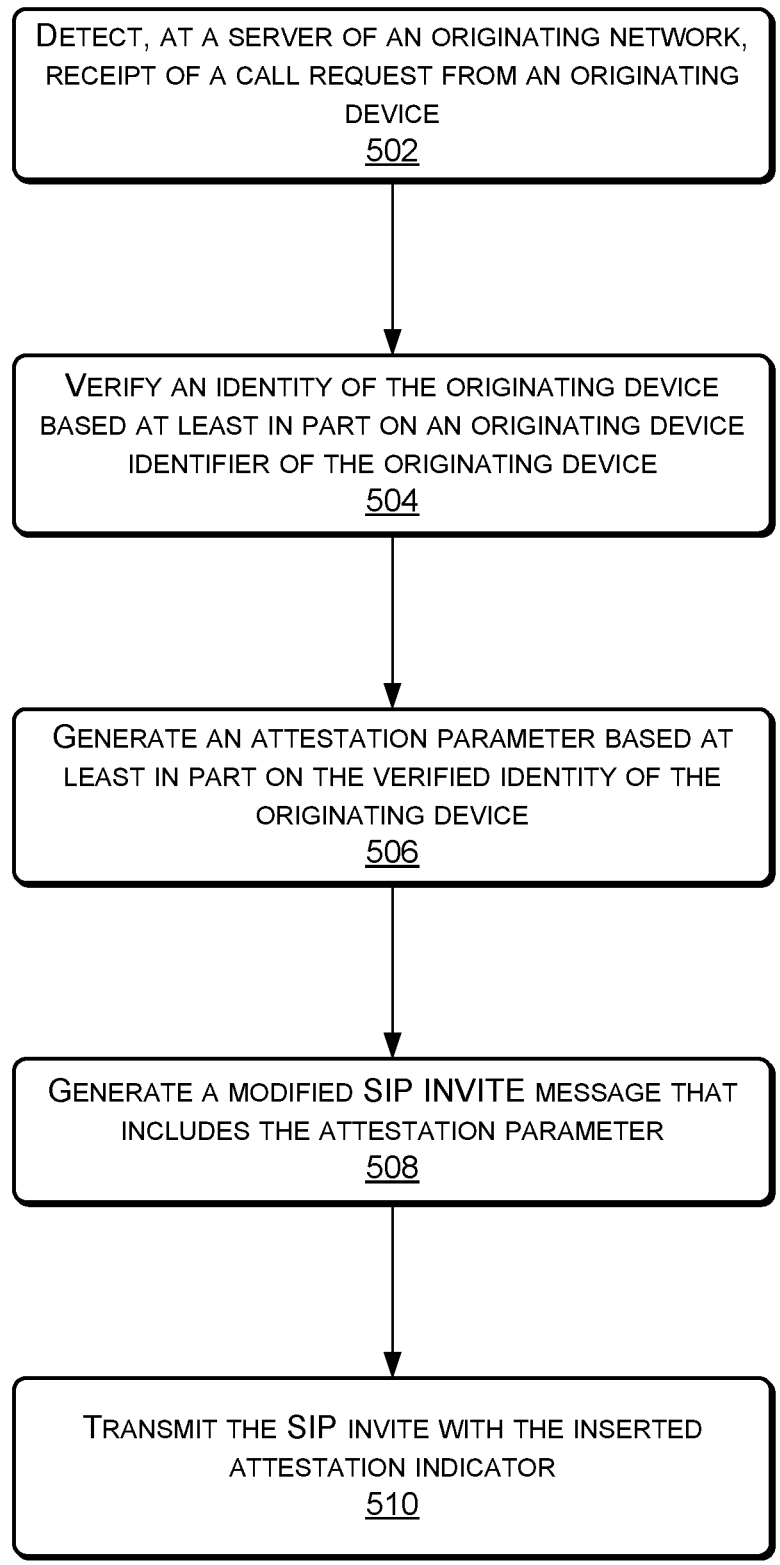
FIG. 5 illustrates a process for transmitting to a server, a modified SIP INVITE message that includes an attestation parameter.

FIG. 5 presents process 500 that relates to operations of the attestation parameter module 102. Process 500 illustrates a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, process 500 is described with reference to the computing environments of FIGS. 1A and 1B.

FIG. 5 illustrates a process for generating a modified SIP INVITE message that includes an attestation parameter for a call request initiated at an originating network. In one example, the originating network may correspond to SIP network, such as an LTE telecommunication network. In another example, the originating network may correspond to a non-SIP network, such as a 2G or 3G telecommunication network. In each example, however, the modified SIP INVITE message is intended to initiate a VoIP communication with a recipient device in receiving, SIP network.

At 502, an attestation parameter module may detect, at a server of an originating network, receipt of a call request from an originating device. In a SIP originating network, the call request may correspond to a SIP INVITE message that is configured to initiate a VoIP communication between the originating device and a recipient device in receiving SIP network.

At 504, the attestation parameter module may verify an identity of the originating device based at least in part on an originating device identifier associated with the originating device. In a SIP originating network, the attestation parameter module may retrieve the originating device identifier from an identity header of the SIP INVITE message. In a non-SIP originating network, the attestation parameter module may retrieve the originating device identifier from the call request.

The attestation parameter module may verify the identity of the originating device by comparing the originating device identifier with the data records from one or more caller-identity lists accessible via the originating network. The one or more caller-identity lists may include a list of data records from an HSS of the originating network, a list of known-permissible caller identities, or a list of known-impermissible caller identities.

At 506, the attestation parameter module may generate an attestation parameter based at least in part on the verified identity of the originating device. By way of example, the attestation parameter may indicate that the originating device is known-permissible, known-impermissible, or unknown.

At 508, the attestation parameter module may generate a modified SIP INVITE message that includes the attestation parameter. In a SIP originating network, the attestation parameter module may generate the modified SIP INVITE message by modifying the identity header of the SIP INVITE message to include the attestation parameter. In a non-SIP originating network, the attestation parameter module may generate a SIP INVITE message and further modify the SIP INVITE message to include the attestation parameter in an identity header of the SIP INVITE message.

At 510, the attestation parameter module may transmit the modified SIP INVITE message to a server associated with the originating network for delivery to the receiving, SIP network. In a SIP originating network, the server may correspond to a TAS. In a non-SIP originating network, the server may correspond to an MSC.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A Mobile Switching Center (MSC) of a first network, comprising:
one or more processors;
memory coupled to the one or more processors, the memory including one or more modules that are executable by the one or more processors to:
detect receipt of a call request initiated by an originating device within the first network, the call request configured to initiate a telephony communication with a Voice over Long-Term Evolution (VoLTE) recipient device within a second network, wherein the first network is a non-Session Internet Protocol (SIP) network;
verify, via the MSC, an identity of the originating device;
in response to verifying the identity of the originating device as a known-permissible caller identity, generate, at the MSC, a SIP INVITE message to initiate the telephony communication between the originating device and the VoLTE recipient device;
modify, at the MSC, the SIP INVITE message to create a modified SIP message that includes an attestation parameter, based at least in part on the identity of the originating device; and
transmit, via the MSC, the modified SIP INVITE message to the second network associated with the VoLTE recipient device, the VoLTE recipient device to use the attestation parameter within the modified SIP INVITE message to verify the identity of the originating device.

2. The MSC of claim 1, wherein the second network corresponds to SIP network, and wherein the MSC is configured to transmit the modified SIP INVITE message to a Telephony Application Server (TAS) of the second network.

3. The MSC of claim 1, wherein
to generate the modified SIP INVITE message occurs via an attestation parameter module of the MSC.

4. The MSC of claim 1,
wherein, to generate, at the MSC, the modified SIP INVITE message corresponds to generating a SIP message and modifying an identity header of the SIP INVITE message to include the attestation parameter.

5. The MSC of claim 1, wherein the one or more modules are further executable by the one or more processors to:
retrieve, from the call request, an originating device identifier associated with the originating device, the originating device identifier corresponding to one of phone number, a Mobile Station International Subscriber Directory Number (MSISDN), or an International Mobile Subscriber Identity (IMSI), and
wherein to verify the identity of the originating device is based at least in part on a comparison of the originating device identifier with data records associated with one or more caller-identity lists associated with the first network.

6. The MSC of claim 5, wherein the one or more caller identity lists include a first list of known permissible caller identities or a second list of known impermissible caller identities.

7. The MSC of claim 1, wherein the attestation parameter identifies the originating device as one of the known-permissible caller identity, a known-impermissible caller identifier, or an unknown caller identity.

8. The MSC of claim 1, wherein the one or more modules are further executable by the one or more processors to:
detect, at the MSC, receipt of an additional call request that includes an additional modified SIP INVITE message from a VoLTE originating device within a third network, the additional modified SIP INVITE message to initiate an additional telephony communication between the VoLTE originating device and a non-VoLTE recipient device within the first network; and
reject the additional call request.

9. The MSC of claim 1, wherein the one or more modules are further executable by the one or more processors to:
detect, at the MSC of the first network, receipt of an additional modified SIP INVITE message from a VoLTE originating device within a third network, the additional modified SIP INVITE message to initiate an additional telephony communication between the VoLTE originating device and a non-VoLTE recipient device within the first network;
verify a VoLTE originating device identifier of the VoLTE originating device, based at least in part on a permissible list of caller-identities associated with the first network; and
in response to verifying the VoLTE originating device identifier as the known-permissible caller identity, establish a non-VoIP communication between the VoLTE originating device and the non-VoLTE recipient device.

10. A computer-implemented method, comprising:
under control of one or more processors:
detecting, at an MSC of a Home Public Land Mobile Network (HPLMN), receipt of a call request initiated by a non-VoLTE device within the HPLMN, the call request to initiate a telephony communication with a VoLTE device in a Visited Public Land Mobile Network (VPLMN);

retrieving, from the non-VoLTE device, a device identifier associated with the non VoLTE device;

verifying an identity of the non-VoLTE device, based at least in part on the device identifier;

generating, at the MSC, a SIP INVITE message to initiate a telephony communication between the non-VoLTE device and the VoLTE device;

generating an attestation parameter for the non-VoLTE device, based at least in part on verifying the identity of the non-VoLTE device;

generating a modified SIP INVITE message by modifying an identity header of the SIP INVITE message to include the attestation parameter; and transmitting, to the VPLMN, the modified SIP INVITE message.

11. The computer-implemented method of claim 10, wherein verifying the identity of the non-VoLTE device further includes comparing the device identifier of the non-VoLTE device with a list of data records within at least one of a Home Subscriber Server (HSS) of the HPLMN or a permissible list of caller identities, and wherein, the attestation parameter is generated to identify the non-VoLTE device as a known-permissible identity, based at least in part on the device identifier being included within the list of data records of at least one of the HSS or the permissible list of caller identities.

12. The computer-implemented method of claim 11, wherein the attestation parameter identifies the non-VoLTE device as an unknown identity, based at least in part on the device identifier not being included within the list of data records of the HSS and the permissible list of caller identities.

13. The computer-implemented method of claim 10, further comprising:

comparing the device identifier with an impermissible list of caller-identities; and determining that the device identifier is included within an impermissible list of caller-identifies, and wherein, the attestation parameter identifies the non-VoLTE device as a known-impermissible identity.

14. The computer-implemented method of claim 10, further comprising:

detecting, at the MSC of the HPLMN, an additional call request from an additional non-VoLTE device within a third network, the additional call request to initiate an additional telephony communication between the VoLTE device and the additional non-VoLTE device;

verifying an additional identity of the additional non-VoLTE device; and in response to verifying that the additional identity of the additional non-VoLTE device is a known-permissible caller identity, establish the telephony communication session between the VoLTE device and the additional non-VoLTE device.

15. One or more non-transitory computer-readable media storing computer-executable instructions that, when executed on one or more processors, cause the one or more processors to perform acts comprising:

detecting, at a Mobile Switching Circuit (MSC) of a non-SIP network, receipt of a call request from an originating device within the non-SIP network to initiate a telephony communication with a VoLTE recipient device within a SIP network;

retrieving from the call request an originating device identifier associated with the originating device;

verifying an identity of the originating device, based at least in part on the originating device identifier;

in response to verifying the identity of the originating device as a known-permissible caller identity, generating an attestation parameter that identifies the originating device as the known-permissible caller identity;

generating, at the MSC, a SIP INVITE message that is configured to initiate the telephony communication between the originating device and the VoLTE recipient device;

generating, at the MSC, a modified SIP INVITE message by modifying an identity header of the SIP INVITE message to include the attestation parameter; and transmitting, to the SIP network, the modified SIP INVITE message.

16. The one or more non-transitory computer-readable media of claim 15, wherein the attestation parameter identifies the originating device as one of the known-permissible caller identity, a known-impermissible caller identifier, or an unknown caller identity.

17. The one or more non-transitory computer-readable media of claim 15, wherein verifying the identity of the originating device further includes comparing the originating device identifier with one or more caller-identity lists associated with the non-SIP network, the one or more caller-identity lists including a first list of data records from a Home Subscriber Server (HSS) associated with the non-SIP network, a second list of known-permissible caller identities, and a third list of known-impermissible caller identities.

18. The one or more non-transitory computer-readable media of claim 15, wherein acts further comprise:

detecting, at the MSC of the non-SIP network, receipt of an additional call request that includes an additional modified SIP INVITE message from a VoLTE originating device within an additional SIP network, the additional modified SIP INVITE message to initiate an additional telephony communication between the VoLTE originating device and an additional non-VoLTE recipient device within the non-SIP network; and rejecting the additional call request.

19. The one or more non-transitory computer-readable media of claim 15, wherein acts further comprise:

detecting, at the MSC of the non-SIP network, receipt of an additional call request that includes an additional modified SIP INVITE message from a VoLTE originating device within a third network, the additional modified SIP INVITE message to initiate an additional telephony communication between the VoLTE originating device and a non-VoLTE recipient device within the non-SIP network;

verifying a VoLTE originating device identifier of the VoLTE originating device, based at least in part on a permissible list of caller-identities associated with the non-SIP network; and in response to verifying the VoLTE originating device identifier as the known-permissible caller identity, establishing a non-VoIP communication between the VoLTE originating device and the non-VoLTE recipient device.

* * * * *